(No Model.)  2 Sheets—Sheet 1.
W. F. MODES.
HOOD OR MUFFLER FOR GLASS TANK FURNACES.
No. 514,487.  Patented Feb. 13, 1894.
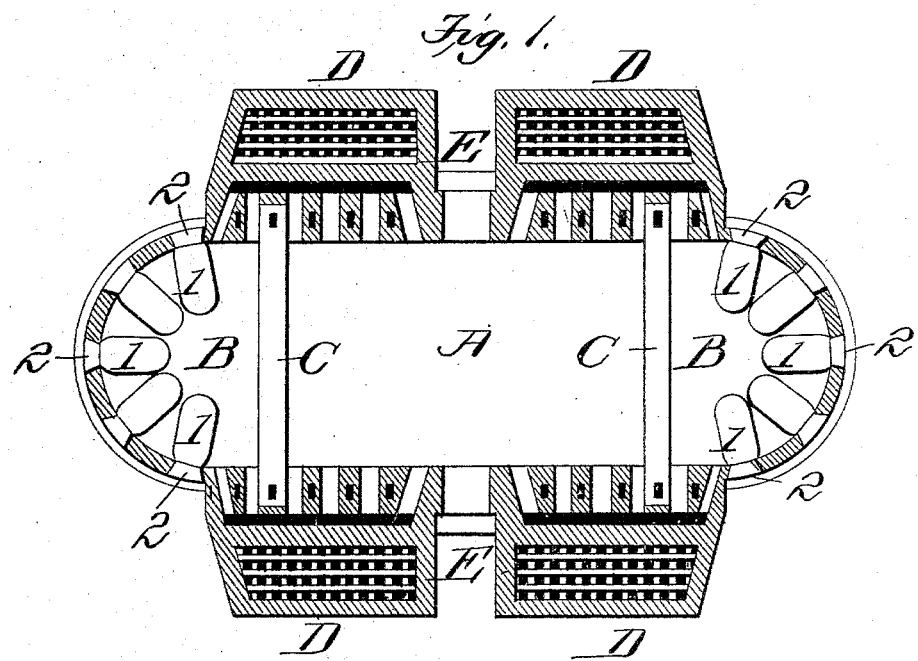
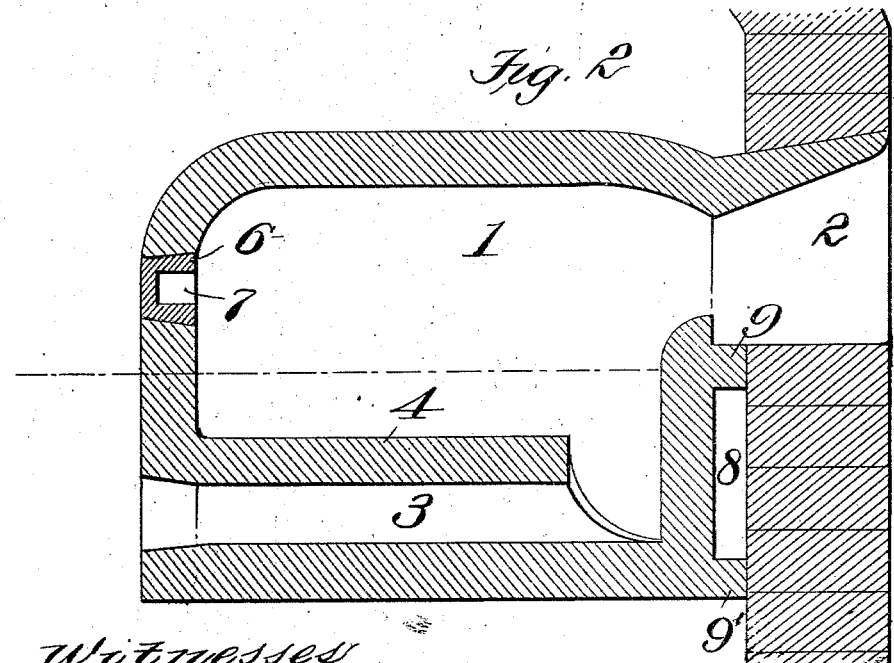
Witnesses
F. P. Cornwall
Hugh K. Wagner
Inventor
William F. Modes
By Paul Bakewell his atty (No Model.) 2 Sheets—Sheet 2.

W. F. MODES.
HOOD OR MUFFLER FOR GLASS TANK FURNACES.

No. 514,487. Patented Feb. 13, 1894.

Witnesses
F. R. Cornwall
Hugh K. Wagner

Inventor
William F. Modes
By Paul Bakewell
his att

UNITED STATES PATENT OFFICE.

WILLIAM F. MODES, OF STREATOR, ILLINOIS.

HOOD OR MUFFLER FOR GLASS-TANK FURNACES.

SPECIFICATION forming part of Letters Patent No. 514,487, dated February 13, 1894.

Application filed September 9, 1893. Serial No. 485,151. (No model.)

*To all whom it may concern:*

Be it known that I, WILLIAM F. MODES, a citizen of the United States, residing at Streator, in the county of La Salle, in the State of Illinois, have invented a certain new and useful Improvement in Hoods or Mufflers for Glass-Tank Furnaces, of which the following is a full, clear, and exact description, reference being had to the accompanying drawings, forming a part of this specification, wherein—

Figure 3:
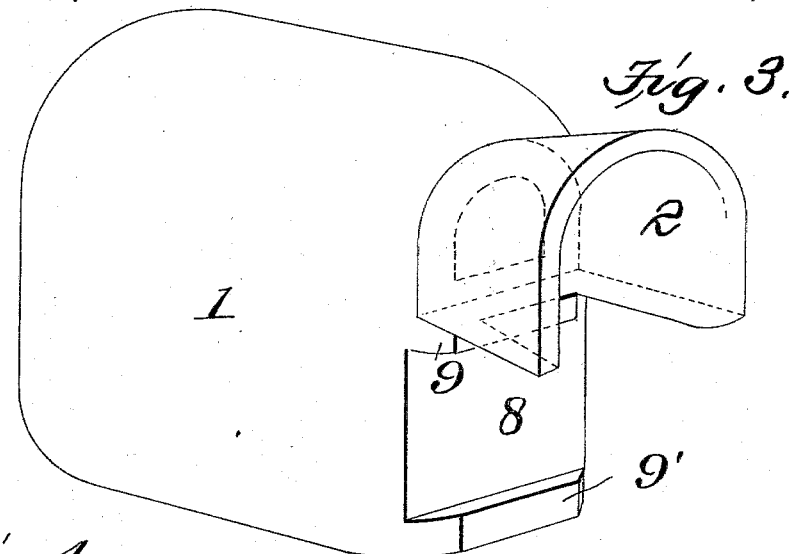
Figure 4:
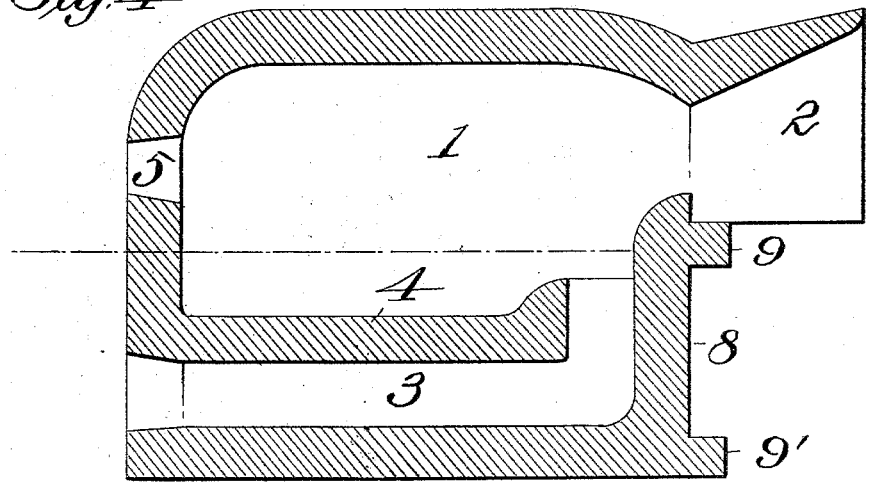
Figure 5:
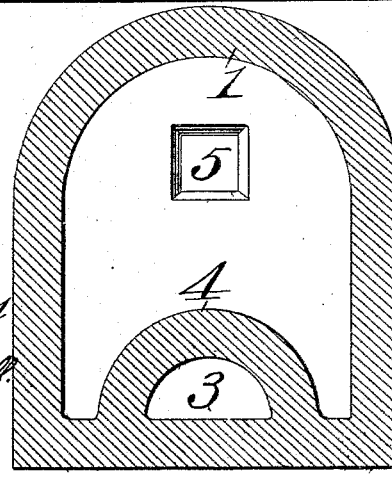

Figure 1 is a longitudinal sectional view through a tank furnace, illustrating the position of my improved refined glass chambers therein. Fig. 2 is a vertical longitudinal section through one of the chambers, illustrating its position relative to the breast wall of the working-out chamber. Fig. 3 is a perspective view of one of the chambers, looking at its front end. Fig. 4 is a longitudinal section through another form of chamber. Fig. 5 is a cross-sectional view, looking toward the rear.

Heretofore, the method of operating what is known as "tank furnaces" for melting glass has been to fuse or melt the batch in the melting chamber, whence it passes into the working out chamber or chambers, in a comparatively refined state, by reason of the separating mid-skimmer wall, which divides the two compartments, through or under which the molten mass passes, where it is separated from the slag or floating skim. When it reaches this working-out chamber, the mass is comparatively free from foreign substances, but by reason of the fact that the molten glass is being constantly removed through the working-out holes, and new material is being constantly introduced for fusion through the charging door into the melting compartment, it follows that unfused particles find their way into the working out end of the tank, which particles, containing gas, as they do, float on the surface until complete fusion takes place, when the gas escapes, after which they sink, by becoming densified. This condition exists continually, or so long as the "continuous" process is followed, and is of such nature as to render the surface of the glass in the working-out end unfit for use, by reason of the glass being full of knots (unfused particles) which cause the glass to be "ropy" or "cordy," as it is termed. This condition is further aggravated from the fact that on the bottom sides and breast of the tank, the glass is partially solidified by reason of the "cooling cave" underneath and the air-spaces therearound, which retards, in a great measure, absolute fusion, so that the glass at these points is generally considered poor in quality and unfit for use. This leaves the fine glass in the middle of the working-out end of the tank, where it is not easily accessible. This state has led to the adoption of hoods or mufflers, as they may be termed, which are in construction semi-spherical in shape, bottomless, and provided with a neck or extension leading up into and through the working-out holes.

This hood or muffler is seated or rests on a shelf extending from the bottom of the tank, and its bottom is below the glass line level, enabling the glass to rise therethrough in seeking its own level, which enables the operator to work in the same without fear of drawing the unfused particles emanating from beneath the mid-skimmer wall, which are excluded, by the walls of the hood, from its interior, on his tube, or in his ladle, as the case may be. This construction has its objections, they residing chiefly in the fact that the metal nearest the breast of the tank reaches a stage of consistency thicker and more solidified than that farther back in the hood, by reason of the close proximity of the cold breast wall, which not only thickens the metal, but, by the constant influx of the hotter metal, becomes "cordy" or "ropy," which will, in course of time, so choke the space immediately beneath the hood as to cause the inconvenience of "cleaning out." Outside of this great disadvantage of being compelled to take the metal from the back of the hood, in order to secure the finest quality of glass, the temperature of the glass cannot be regulated in any one hood without regulating the temperature of the whole mass. This temperature, which determines the consistency of the glass, is an important factor, and, heretofore, has been regulated by closing the working-out holes to increase it to make the metal thinner for small work, and, to reduce it, the working-out holes have been left open, which admit the cold air and thickens the metal for use in large work. And in no case am I aware that varying temperatures have been sought to be obtained in the same mass of metal for working purposes, so that workmen could work on different classes of work, requiring glass of different consistencies, from the working-out end of one furnace without materially affecting the temperature of the metal of his neighbor.

This present invention relates to such a hood or muffler, and is adapted for use as above described, the object being to overcome and remedy the defects of those now in use and in which will also be found other incidental advantages in the construction, arrangement, and combination of parts, all of which tend, in their way, to provide a structure which is cheap and effective, and one which will perform its functions in the simplest and most satisfactory manner.

The essential features of my invention reside, in the peculiar formation of a hood or muffler, in such manner that it may be built into the breast wall of the working-out end of the furnace and be supported by a flaring neck which projects through said breast wall, forming the working-out hole. In addition to this, the front end of the hood is provided with a projection which rests upon the inner face of the breast wall, and helps support or brace the hood, at the same time forming a space between the hood and breast wall for the circulation of the molten metal. Also, in the peculiar construction and arrangement of the interior of the hood, whereby the same is divided into two compartments, the upper of which opens into the working-out hole and is connected to the lower one at the front end of the hood, which lower compartment leads into the working-out end of the furnace at the rear end of the hood below the glass line level. In the arrangement of two or more hoods of this peculiar construction in the working-out end of a glass tank furnace, and in providing each with means for individual regulation. And, finally, in minor details of construction, arrangement, and combination of the several parts, all as will hereinafter be described and afterward pointed out in the claims.

Referring to the drawings, wherein like symbols of reference refer to like parts wherever they occur:—A indicates the melting chamber of a continuous tank furnace; B, the working-out chambers, in this instance, one being located at each end, which working-out chambers are separated from the melting chamber by the mid-skimmer walls C; D indicates the regenerators, arranged at the sides of the tank; and E, the charging openings. This construction is of old and well-known form, and is shown merely to illustrate the application of my invention thereto, and it will be obvious, from the following description, that the hoods are as applicable to other forms of furnaces as this; therefore, I do not wish to be understood as confining myself to the one shown.

Built in, or otherwise secured to, the breast wall of the working-out chamber, through the medium of their necks 2, are the hoods 1, arranged so as to form a battery, which extends inwardly to such a distance as place their rear ends remotely from the breast wall, and, in the instance of a semi-circular breast wall, as shown in Fig. 1, these hoods are radially disposed, being fed from about the center of the working-out chamber.

By the peculiar shape of the neck 2 of the hood (I will describe but one, which description is applicable to all), which is formed flaring, as shown, the masonry of the breast wall can be built therearound, and, by reason of the bearings of the lower portion of the hood against the interior of the breast wall, the same will be virtually suspended in such manner as to be above the bottom of the tank, and below the glass-line level, which suspension is materially assisted by the metal, whose displaced bulk is heavier than the weight of the submerged portion of the hood.

Arranged in the lower portion of the hood, so as to lead to beneath the glass line level, and at the inner end of the hood, is a channel or in-lead chamber 3, formed by the wall or partition 4, which channel or in-lead chamber extends along the lower portion of the hood, beneath the glass line level, to the front end thereof, at which point it discharges, either directly upon the bottom, as shown in Fig. 2, or slightly above the bottom, as shown in Fig. 4, but in any instance the discharge should be made in such manner and at such point as to be at the front end of the chamber in order to keep the temperature of that portion up to a degree commensurate with the demands for preventing the glass from becoming "ropy" or "cordy" at that point.

To regulate the temperature of the glass and thereby determine its consistency, I arrange in the wall of the hood, preferably at the rear, in order to give the cold air a longer sweep across the surface of the contained metal, a port 5, which is preferably formed tapering and which is adapted to be closed by the insertion of a block or plug 6, tapered correspondingly, which taper prevents the same from falling into the working-out chamber. I also form a recess 7 in the front face of this plug, into which is received a suitable rod or instrument for the purpose of handling.

When it is desired to increase or raise the temperature of the metal in the hood, the plug 6 is inserted, which prevents the circulation of the air, and the regenerators, acting on the rear wall of the hood, will soon raise the temperature of the metal to a degree corresponding to that of the metal outside, and which increase in temperature is accelerated by the introduction of the outside metal through the channel 3.

To reduce the temperature and thicken the consistency of the metal in the hood, I remove the plug 6, which immediately creates a circulation of cold air throughout the length of the hood chamber, by reason of the draft passing across the inner ends of the working-out chambers which sucks in the cold air through the ports 5 in the inner end of the hood.

Each of these hoods is provided with a similar contrivance for its individual regulation, and it follows that the regulation of one will not affect any of the others in that battery.

The front end of the hood is reduced or recessed, as at 8, to form a space therebetween and the breast wall, which will permit the introduction of the hot metal between the hood and the breast wall, and, in that way, prevent the chill being communicated to the former, which tends to keep the temperature of the metal in the hood regular and even throughout. This recess 8, as stated before, is formed by reducing the front face of the hood, which reduction leaves the projecting lips 9 and 9', whose function is to bear against the interior of the breast wall, and act as a brace for the suspended hood.

I am aware that many minor changes in the construction, arrangement, and combination of the several parts of my invention may be made and substituted for those herein shown and described, without in the least departing from the nature and principle of my invention.

Having thus described my invention, what I claim, and desire to secure by Letters Patent, is—

1. In combination with the working-out end of a glass furnace, of a battery of hoods or mufflers arranged therein, said hoods or mufflers taking glass from the working-out chamber at their rear ends only, and each being provided with means for individual regulation, substantially as described.

2. In combination with the working out end of a glass tank furnace, of a battery of hoods or mufflers arranged therein, each being provided with a horizontally-disposed partition-wall, dividing the same into two chambers, one of which opens to the working-out opening, and is connected to the other at the front end of the hood, and the other, opening into the working-out chamber at the rear end of the hood below the surface of the material therein, substantially as described.

3. In combination with the working-out end of a glass furnace, of a battery of hoods or mufflers formed with flaring necks around which the breast wall is built, and by which the same are supported, said hoods or mufflers being so constructed that their front ends rest against the inner side of the breast wall and form a space between the body of the hood and the breast wall for the circulation of the molten metal, substantially as described.

4. In combination with the working-out end of a glass furnace, of one or more hoods or mufflers formed with a channel or in-lead chamber opening into the working-out chamber, at the rear of the hood, and opening into the hood at its front end, substantially as described.

5. In combination with the working-out end of a glass furnace, of one or more hoods or mufflers built into the breast wall thereof, said hoods or mufflers being divided into two compartments, the upper of which opens into the working-out hole, and is connected to the lower one at the front end of the hood, which lower compartment leads into the working-out chamber at the rear end of the hood below the glass-line level, substantially as described.

6. In combination with the working-out end of a glass furnace, of one or more hoods or mufflers having openings leading through working-out holes, and means for regulating the temperature of each hood individually, substantially as described.

7. In combination with the working-out end of a glass furnace, of one or more hoods or mufflers arranged at the working-out holes, and means for admitting and regulating a circulation of air through or in each individual hood, substantially as described.

8. The combination with the working-out end of a glass furnace, of a battery of hoods or mufflers having channels opening into the working-out chambers at their rear ends below the glass line level and discharging into hoods at their front ends, said hoods being provided with ports above the glass line level, and plugs for said ports, substantially as described.

9. In a hood or muffler, the combination with the body portion, of a wall or partition arranged so as to form a channel or inlead chamber, which opens to the exterior at the lower rear end, and to the interior at the front end of the hood, said body portion being provided with a port in its rear wall, substantially as described.

10. In a hood or muffler, the body portion forming the hood chamber, which chamber connects at its front end with an inlead chamber, which latter chamber opens to the exterior at the back end of the hood, said hood being also formed with a tapering port in its rear wall near the top, and a plug, similarly tapered, which is adapted to be inserted in said port, said plug being recessed for the insertion of a handling tool in its forward end, substantially as described.

11. A hood or muffler, for glass tanks, which consists of a body portion having a flaring neck at its upper forward end, said hood being formed with a channel or inlead chamber at its bottom which opens to the exterior at the rear, and to the interior at the front ends of the hood, which hood is also provided with a port in its rear wall, and formed with a recess or reduced portion on its front end below the neck, substantially as described.

In testimony whereof I hereunto affix my signature, in presence of two witnesses, this 4th day of September, 1893.

WILLIAM F. MODES.

Witnesses:
F. R. CORNWALL,
HUGH K. WAGNER.